(12) United States Patent
Ohtsu et al.

(10) Patent No.: US 7,221,544 B2
(45) Date of Patent: May 22, 2007

(54) MAGNETIC RECORDING APPARATUS AND MAGNETIC HEAD

(75) Inventors: Takayoshi Ohtsu, Oi (JP); Shinji Narishige, Ninomiya (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 401 days.

(21) Appl. No.: 10/206,751

(22) Filed: Jul. 26, 2002

(65) Prior Publication Data

US 2003/0021070 A1    Jan. 30, 2003

(30) Foreign Application Priority Data

Jul. 27, 2001    (JP)    ............... 2001-226991

(51) Int. Cl.
*G11B 5/66*    (2006.01)
(52) U.S. Cl. ................................. 360/317
(58) Field of Classification Search ............ 360/234.6, 360/245.1, 245.3
See application file for complete search history.

(56) References Cited

U.S. PATENT DOCUMENTS

| | | | |
|---|---|---|---|
| 5,815,342 A | 9/1998 | Akiyama et al. | |
| 6,671,117 B2 * | 12/2003 | Dimitrov et al. | ............. 360/57 |
| 6,791,800 B2 | 9/2004 | Takeo et al. | |
| 6,813,105 B2 * | 11/2004 | Takano | ......................... 360/17 |
| 2002/0028357 A1 * | 3/2002 | Shukh et al. | ......... 428/694 TM |

FOREIGN PATENT DOCUMENTS

JP    61-32202 A    2/1986

OTHER PUBLICATIONS

Ariake et al. "Preparation of Double Layered Perpendicular Recording Media for Beyond 50 Gb/in$^2$ Areal Density," IEEE Transactions on Magnetics 36:2411-2413 (2000).
Honda et al. "Effect of Soft Magnetic Underlayer on Magnetization Microstructure of Perpendicular Thin Film Media," IEEE Transactions on Magnetics 36:2399-2401 (2000).
Kikukawa et al. "Noise Characteristics of Double-Layered Perpendicular Media Using Novel Soft Magnetic Underlayer Materials,", IEEE Transactions on Magnetics 36: 2402-2404 (2000).
Lairson et al. Disk Drive Integration Issues for Perpendicular Recording, IEEE Transactions on Magnetics 37:1223-1227 (2000).
Takano et al. "Possibility of 40 GB/in$^2$ Perpendicular Recording," IEEE International Magnetics Conference (2000).

* cited by examiner

*Primary Examiner*—Hoa T. Nguyen
*Assistant Examiner*—Mark Blouin
(74) *Attorney, Agent, or Firm*—Townsend and Townsend and Crew LLP

(57) ABSTRACT

Formation of magnetic domains in a perpendicularly magnetized medium comprising an underlayer of a soft magnetic layer is prevented by appropriate magnetic domain control in the soft magnetic layer. One method controls magnetic domains of the soft magnetic layer by applying an external magnetic field to the medium. Another method provides a mechanism in the magnetic head for generating a magnetic field to control the magnetic domains of the soft magnetic layer of the medium.

13 Claims, 7 Drawing Sheets

MAGNETIC RECORDING APPARATUS AND MAGNETIC HEAD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

1. Field of the Invention

The present invention relates to a magnetic recording apparatus and magnetic head, and more particularly to a highly reliable magnetic recording apparatus and magnetic head for high density recording.

2. Description of the Prior Art

In keeping with the move to higher density magnetic recording apparatus in recent years, the problem of thermal relaxation has put limits on improving the recording density of conventional longitudinal recording, and attention has focused on perpendicular magnetic recording. Of the perpendicular magnetic recording systems, one viewed as holding significant promise was reported at the International Magnetics Conference (Intermag 2000), and combines a perpendicularly magnetized medium having a soft magnetic underlayer with a single pole recording head.

A problem in a perpendicularly magnetized medium having a soft magnetic underlayer is that magnetic domains form in the soft magnetic layer. The readback head detects magnetic flux emanating from the domain wall of an underlayer magnetic domain as noise, and this noise can be mistaken for the original signal.

BRIEF SUMMARY OF THE INVENTION

The present invention overcomes the above problems, and to provides a highly reliable magnetic recording apparatus and magnetic head.

Applying appropriate magnetic domain control to the soft magnetic layer is effective for preventing the formation of magnetic domains, which is a problem in a perpendicularly magnetized medium having a soft magnetic underlayer. One method for carrying out magnetic domain control of the soft magnetic layer is to apply an external magnetic field to the medium; another method is to provide the magnetic head with a mechanism that generates a magnetic field to control the magnetic domain of the soft magnetic layer.

DESCRIPTION OF THE PREFERRED EMBODIMENTS

The present invention is particularly useful as a data recording and retrieving system in which data is recorded as an array of magnetic domains on a magnetic medium. Any type of magnetic medium is acceptable, for example, magnetic tape, one or multiple hard disks, or one or multiple flexible disks, or the like. Magnetic domains are ordinarily arranged along tracks, and the configuration of the tracks may be annular, coil shaped, helical, or of indefinite length.

In a typical data recording and retrieving apparatus, a general purpose computer receives input data via an input device, which has one or more interfaces from a network, keyboard, scanner, or the like. In addition to being connected to one or more input devices, the computer can also output to one or more output devices. The output device may be a network, printer, display device or modem, which is connected via an interface to the computer. In addition to other recording apparatus related to a computer, the computer writes data to a magnetic recording apparatus, which is peripheral equipment, and reads data from that apparatus.

Figure 2:
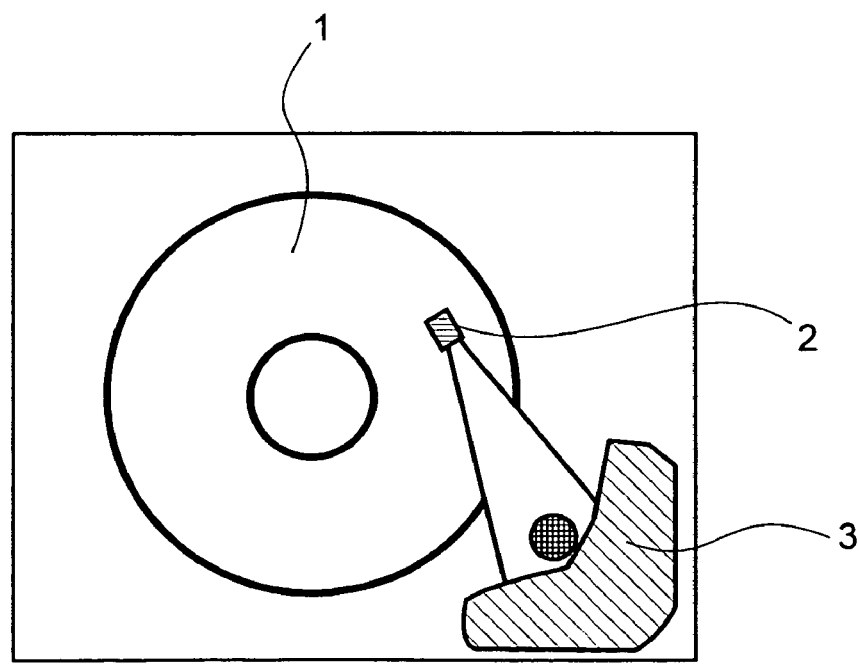
FIG. 2 is a simplified block diagram of an ordinary magnetic disk apparatus.

FIG. 2 shows a typical magnetic recording apparatus including a magnetic disk 1 on which signals are recorded in concentric circles, a magnetic head 2 for recording and reproducing signals on the magnetic disk 1, and a magnetic head positioning mechanism 3 that supports magnetic head 2 and positions the head 2 in a desired location along a radius of magnetic disk 1.

Figure 3:
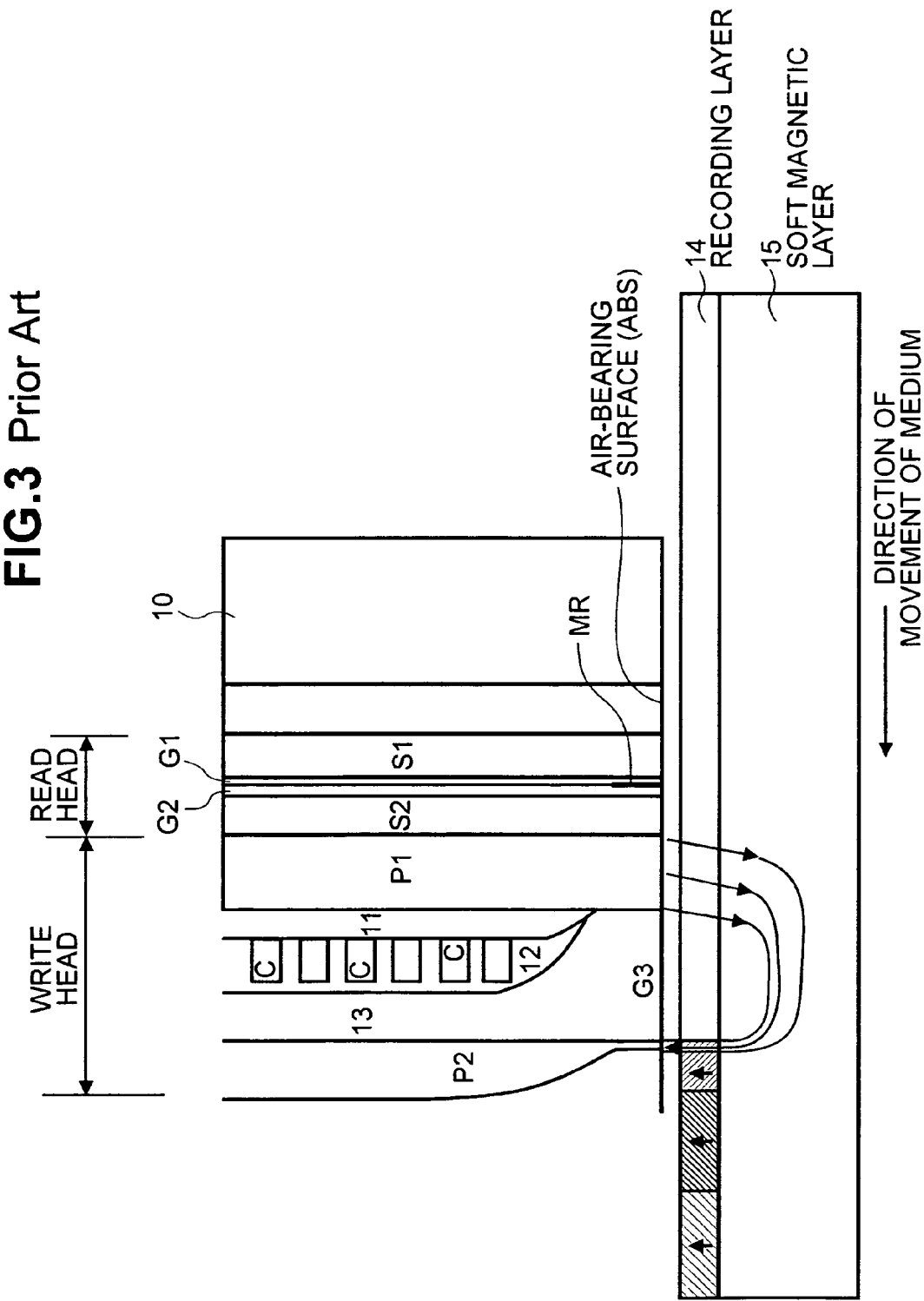
FIG. 3 is a cross-sectional view of an ordinary magnetic head and magnetic recording medium.

FIG. 3 shows a cross-sectional view of a recording medium and magnetic head. Since the head forms an air-bearing surface (ABS), it is subjected to lapping, and the ABS maintains a spacing from the surface of the recording medium via air bearing. The read head has a magnetoresistive layer (MR sensor) sandwiched between a first gap layer G1 and a second gap layer G2 on a substrate 10, and these first and second gap layers G1, G2 are sandwiched between a first magnetic shield layer S1 and a second magnetic shield layer S2.

In a conventional disk drive, the MR sensor is a spin-valve sensor. The write head has a coil layer C and an insulating layer I2, these are sandwiched between insulating layers I1 and I3, and these insulating layers I1, I3 are also sandwiched between a first magnetic pole piece P1 and a second magnetic pole piece P2. A third gap G3 is sandwiched between the ends of first magnetic pole piece P1 and second magnetic pole piece P2 adjacent to the ABS, and forms a magnetic gap. At write time, a signal current is led through coil layer C, and magnetic flux leaks out via the air bearing surface. The leaked magnetic flux returns to the magnetic head via a soft magnetic layer 15 beneath the recording layer 14.

This magnetic flux magnetizes a peripheral track on the recording medium in a perpendicular direction between write operations. In read mode, leakage magnetic flux from the magnetized domain of the rotating recording medium is injected into the MR sensor of the read head, causing a change in resistance on the inside of the MR sensor. This change in resistance is determined by detecting the voltage change across the MR sensor. The preceding descriptions of an ordinary magnetic disk drive having an MR read head, and of the magnetic head and the medium are for the purpose of facilitating understanding of the present invention.

The present invention performs magnetic domain control of the soft magnetic layer 15 of a recording medium either by a magnetic field external to the medium, or by a magnetic field from the magnetic head.

Figure 1:
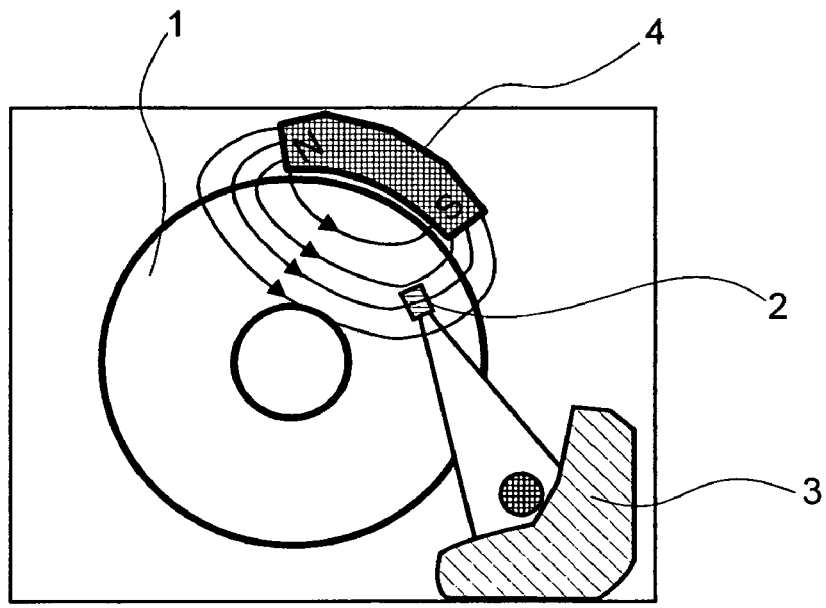
FIG. 1 is a simplified block diagram of a magnetic disk apparatus showing a first embodiment of the present invention.

A first embodiment of the present invention is shown in FIG. 1. This embodiment is characterized by a mechanism generating a magnetic field external to the recording medium. This embodiment makes use of a permanent magnet 4. Magnetic flux emitted by magnetic pole N returns to magnetic pole S via the soft magnetic layer inside the medium. The direction of magnetization of the soft magnetic layer can be controlled by this magnetic field. It is desirable that the strength of the magnetic field from permanent magnet 4 be weaker than the magnetic field generated by the recording head, and that it does not affect the magnetization of the recording magnetic layer at readback. Generally, the strength of the magnetic field from permanent magnet 4 should be between several tens of A/m (several Oe) and several thousand A/m (several tens of Oe). In the studies of the inventors, favorable characteristics were obtained when the magnetic field in the vicinity of the readback head was about 1600 A/m (20Oe).

Figure 4:
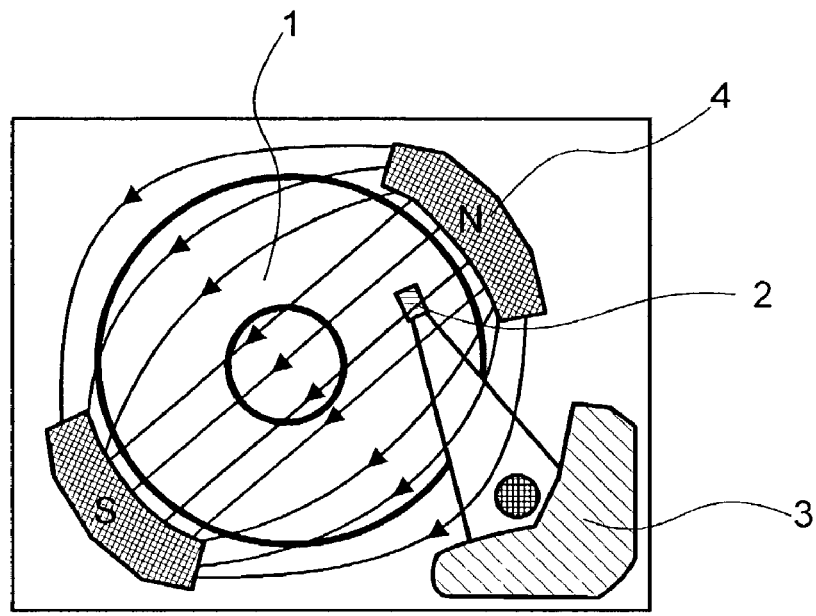
FIG. 4 is a simplified block diagram of a magnetic disk apparatus showing a second embodiment of the present invention.

A second embodiment of the present invention is shown in FIG. 4. In this embodiment, two permanent magnets 4 are arranged as mechanisms for generating a magnetic field external to the recording medium. The magnetic flux emanating from the magnetic pole N of one magnet returns to the magnetic pole S of the other magnet. The direction of magnetization of the soft magnetic layer within the range of movement of the head is controlled by the magnetic head.

Figure 5:
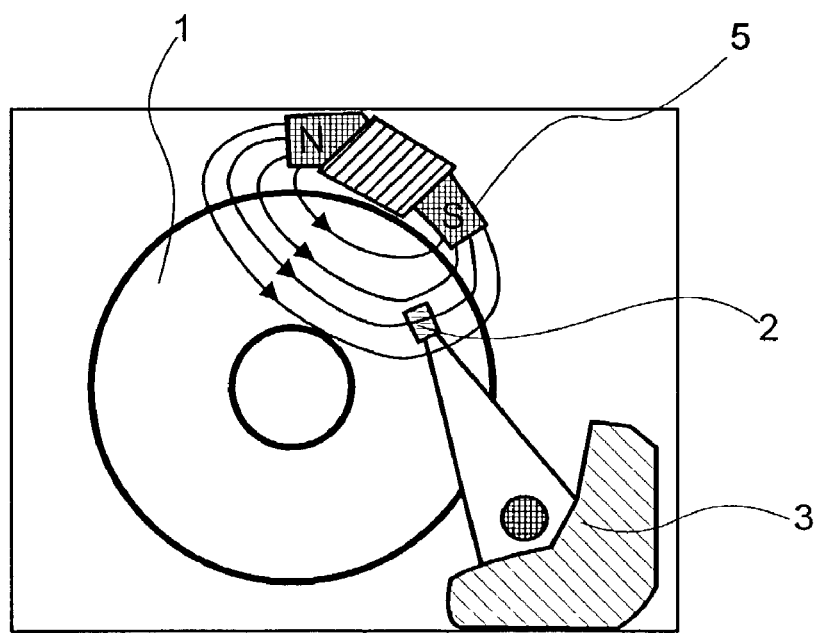
FIG. 5 is a simplified block diagram of a magnetic disk apparatus showing a third embodiment of the present invention.

FIG. 5 shows a third embodiment of the present invention. In this embodiment, an electromagnet 5 is used as the mechanism for generating a magnetic field external to the recording medium.

Figure 6:
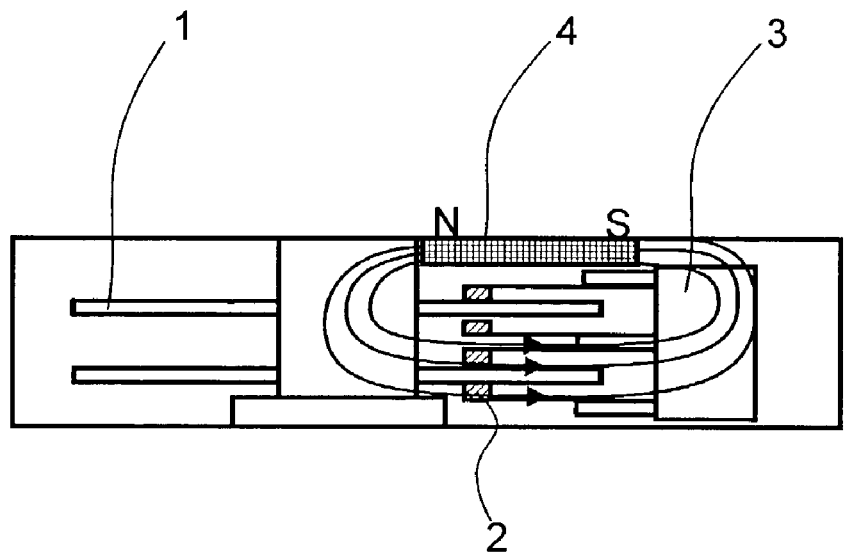
FIG. 6 is a simplified block diagram of a magnetic disk apparatus showing a fourth embodiment of the present invention.

FIG. 6 shows a fourth embodiment of the present invention. A cross-sectional view of the magnetic recording apparatus is shown for this embodiment. In this cross-sectional view, a magnet 4 is installed on the inside of the magnetic recording apparatus. In this example, the direction of magnetization of the soft magnetic layer of the medium is regulated by the magnetic field emitted from magnet 4, which is installed over the surface of medium 1, and this direction of magnetization prevents the generation of a magnetic domain directly beneath magnetic head 2.

Figure 7:
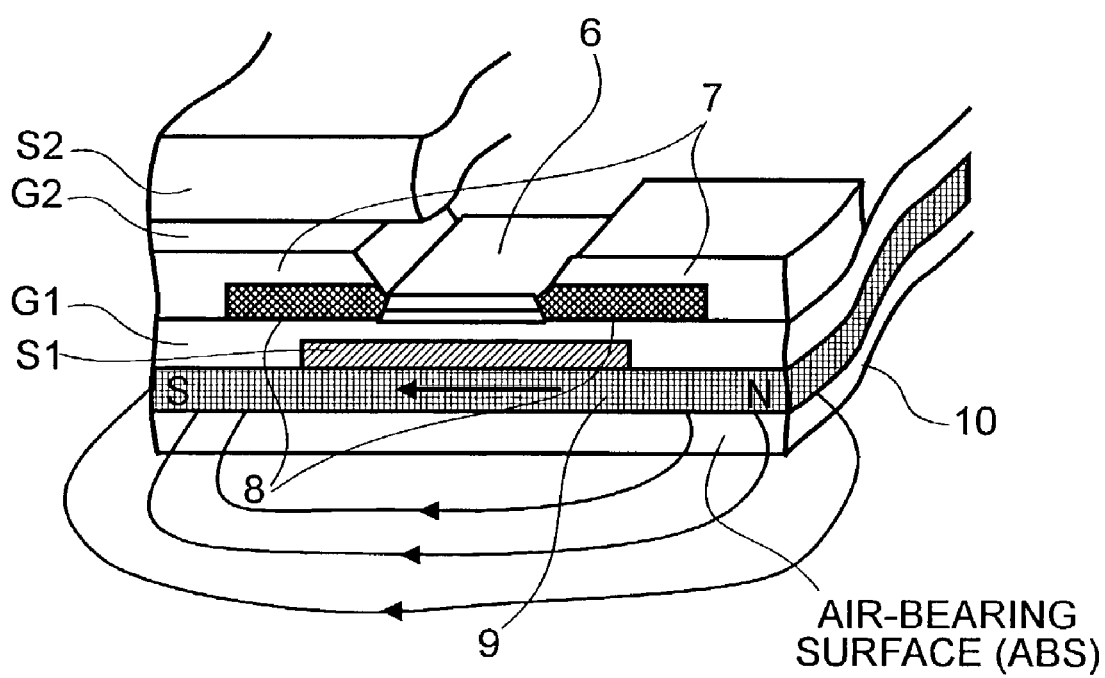
FIG. 7 is a structural diagram of a magnetic head showing a fifth embodiment of the present invention.

FIG. 7 shows a fifth embodiment of the present invention. In this embodiment, a magnetic recording medium has a soft magnetic layer; and a magnetic head, which performs perpendicular recording, comprises a means for generating a magnetic field for controlling magnetic domains in the soft magnetic layer of the medium. A permanent magnet 9 serves as a means for generating a magnetic field for controlling magnetic domains in the soft magnetic layer of the medium. In the magnetic head, a permanent magnet 8 of CoCrPt or the like, is arranged as a magnetic domain control layer for a giant magnetoresistive layer, GMR sensor 6, at both ends of sensor 6. In this example, it is permanent magnet 8, but it may also be a structure which uses an antiferromagnetic layer, called a patterned exchange structure. A wide lower magnetic shield S1 is located below GMR sensor 6, and permanent magnet layer 9, which controls magnetic domains in the medium, is located between this lower magnetic shield S1 and substrate 10. When the magnetic head floats above the medium, magnetic flux generated from the N pole of permanent magnet 9 for medium magnetic domain control returns to the S pole of permanent magnet 9, resulting in magnetic domain control via the soft magnetic layer of the medium. The direction of magnetization of the soft magnetic layer of the medium is controlled by this magnetic field. Because the magnetic domains of the soft magnetic layer of the medium disappear at least in the vicinity of the readback head, noise is not generated at readback time.

Figure 8:
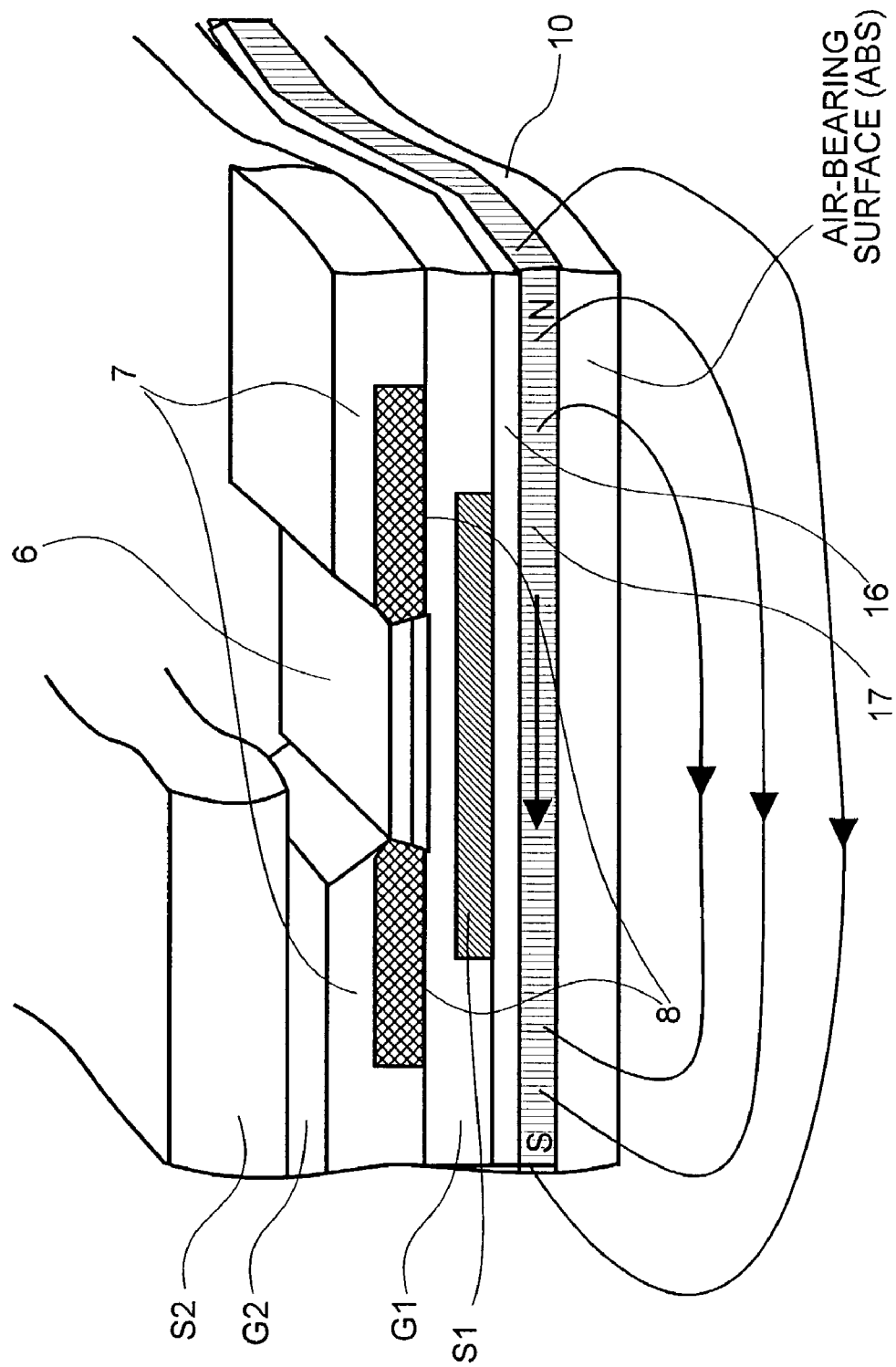
FIG. 8 is a structural diagram of a magnetic head showing a sixth embodiment of the present invention.

FIG. 8 shows a sixth embodiment of the present invention. The means for generating a magnetic field for controlling magnetic domains in the soft magnetic layer of the medium is a magnetic head comprised of stacked layers of an antiferromagnetic layer 16 and a soft magnetic layer 17 disposed on substrate 10. When the magnetic head floats above a medium, magnetic flux generated from the N pole of soft magnetic layer 17 returns to the S pole of soft magnetic layer 17 via the soft magnetic layer of the medium. The direction of magnetization of the soft magnetic layer of the medium is controlled by this magnetic field.

Figure 9:
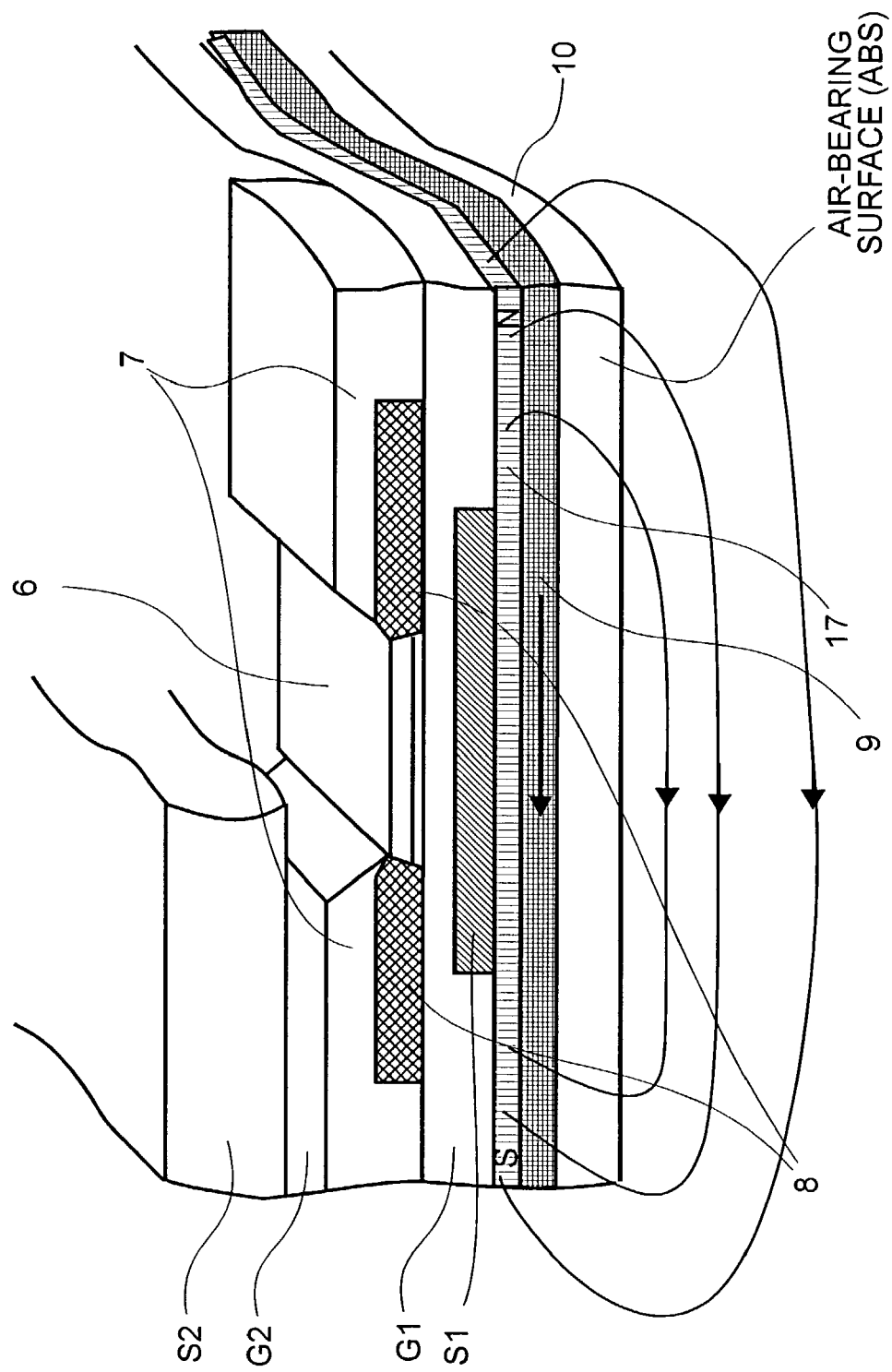
FIG. 9 is a structural diagram of a magnetic head showing a seventh embodiment of the present invention.

FIG. 9 shows a seventh embodiment of the present invention. The means for generating a magnetic field for controlling magnetic domains in the soft magnetic layer of the medium is a magnetic head comprised of stacked layers of a permanent magnet 9 and a soft magnetic layer 17. Magnetic flux generated from the N pole of soft magnetic layer 17 returns to the S pole of soft magnetic layer 17 via the soft magnetic layer of the medium. The direction of magnetization of the soft magnetic layer of the medium is controlled by this magnetic field.

Figure 10:
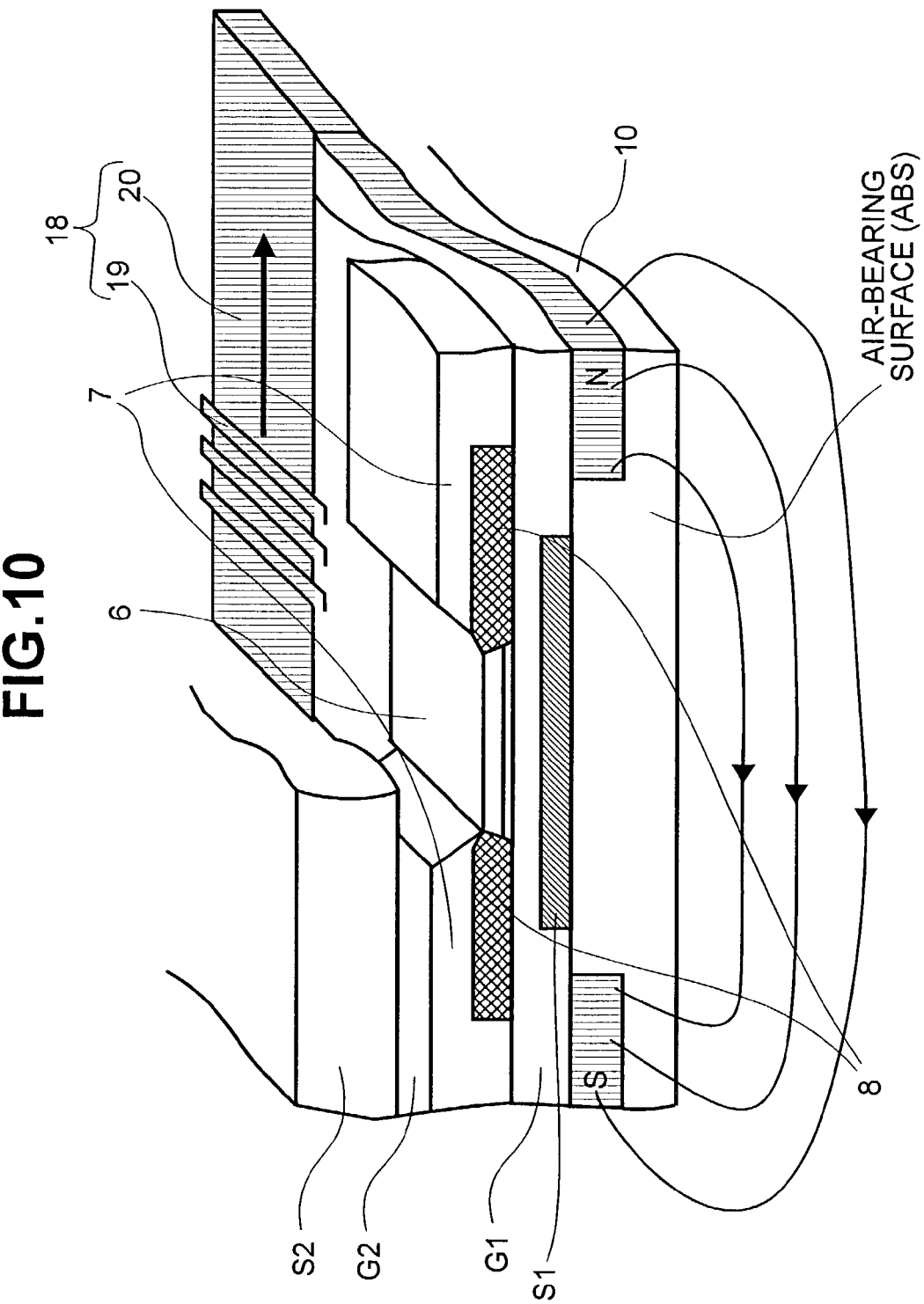
FIG. 10 is a structural diagram of a magnetic head showing an eighth embodiment of the present invention.

FIG. 10 shows an eighth embodiment of the present invention. The means for generating a magnetic field for controlling magnetic domains in the soft magnetic layer of the medium is a magnetic head which employs an electromagnet 18. The electromagnet 18 is composed of a coil 19 and a soft magnetic layer 20. Soft magnetic layer 20 is magnetized by applying an external current to coil 19 to control magnetic domains in the soft magnetic layer of the medium. Magnetic flux generated from the N pole of electromagnet 18, which is excited by coil 19, returns to the S pole of electromagnet 18 via the soft magnetic layer of the medium. The direction of magnetization of the soft magnetic layer of the medium is controlled by this magnetic field.

According to the present invention, it is possible to provide a magnetic recording apparatus and magnetic head that do not generate noise at readback by providing functions in the magnetic recording apparatus for generating an external magnetic field for controlling magnetic domains in the soft magnetic layer of a magnetic recording medium, and by providing a magnetic head having a function that enables the generation of a magnetic field.

What is claimed is:

1. A magnetic recording apparatus comprising:
    a magnetic recording medium having a soft magnetic layer and a recording layer provided above said soft magnetic layer;
    a magnetic head comprising a read head and a recording head; and
    a magnetic field generator comprising a permanent magnet,
    wherein said read head is provided above a substrate and includes a first and a second shield and a sensor,
    wherein said first shield is provided between said sensor and said substrate,
    wherein said permanent magnet is provided between said substrate and said first shield,
    wherein said magnetic field generator generates an external magnetic field to at least a portion under the read head of said soft magnetic layer,
    wherein said sensor, said first shield, said permanent magnet, and said substrate are stacked in a direction perpendicular to the magnetic recording medium.

2. The magnetic recording apparatus according to claim 1, wherein said magnetic field generator generates said external magnetic field in the track width direction to said soft magnetic layer.

3. The magnetic recording apparatus according to claim 1, wherein said recording head generates a magnetic field stronger than said external magnetic field.

4. The magnetic recording apparatus according to claim 1, wherein said permanent magnet is formed of a single layer, and said first shield is formed on said single layer.

5. The magnetic recording apparatus according to claim 1, wherein said magnetic field generator generates said external magnetic filed in the track width direction to said soft magnetic layer.

6. A magnetic recording apparatus comprising:
    a magnetic recording medium having a soft magnetic layer and a recording layer provided above said soft magnetic layer;
    a magnetic head comprising a read head and a write head; and
    a magnetic field generator comprising a permanent magnet,
    wherein said read head is provided above a substrate and includes a first and second shield and a sensor,
    wherein said first shield is provided between said sensor and said substrate,
    wherein said permanent magnet is provided between said substrate and said first shield,
    wherein said magnetic field generator generates a magnetic field to at least a portion adjacent to the read head of said soft magnetic layer to avoid the noise generated during read operation of said magnetic recording head,
    wherein said sensor, said first shield, said permanent magnet, and said substrate are stacked in a direction perpendicular to the magnetic recording medium.

7. The magnetic recording apparatus according to claim 6, wherein said magnetic field generator generates said external magnetic field in the track width direction to said soft magnetic layer.

8. The magnetic recording apparatus according to claim 4, wherein said recording head generates a magnetic field stronger than said external magnetic field.

9. The magnetic recording apparatus according to claim 6, wherein said permanent magnet is formed of a single layer, and said first shield is formed on said single layer.

10. The magnetic recording apparatus according to claim 6, wherein said magnetic field generator generates said external magnetic filed in the track width direction to said soft magnetic layer.

11. A magnetic recording apparatus comprising:
    a magnetic recording medium having a soft magnetic layer and a recording layer provided above said soft magnetic layer;
    a magnetic head comprising a read head and a recording head; and
    a magnetic field generator comprising an electromagnet,
    wherein said read head is provided above a substrate and includes a first and second shield and a sensor,
    wherein said first shield is provided between said sensor and said substrate,
    wherein said electromagnet is provided between said substrate and said first shield,
    wherein said magnetic field generator generates an external magnetic field to at least a portion under the read head of said soft magnetic layer,
    wherein said sensor, said first shield, said permanent magnet, and said substrate are stacked in a direction perpendicular to the magnetic recording medium.

12. The magnetic recording apparatus according to claim 11, wherein said electromagnet comprises a coil and a soft magnetic layer, wherein said coil is formed behind said sensor in the depth direction of the magnetic head.

13. The magnetic recording apparatus according to claim 11, wherein said magnetic field generator generates said external magnetic filed in the track width direction to said soft magnetic layer.

* * * * *